US006710816B1

(12) United States Patent
Minami

(10) Patent No.: US 6,710,816 B1
(45) Date of Patent: Mar. 23, 2004

(54) DIGITAL BROADCAST RECEIVER AND METHOD FOR RECEIVING AND OUTPUTTING DIGITAL BROADCASTS

(75) Inventor: Yoshiaki Minami, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 654 days.

(21) Appl. No.: 09/597,266

(22) Filed: Jun. 20, 2000

(30) Foreign Application Priority Data

Jun. 22, 1999 (JP) .......................................... 11-175404

(51) Int. Cl.[7] ............................ H04N 5/44; H04N 5/60

(52) U.S. Cl. ....................... 348/554; 348/725; 348/731; 348/738

(58) Field of Search ................................ 348/725, 738, 348/732, 731, 734, 632, 634, 553, 554, 563, 564, 565, 569, 705, 706, 567; 455/174.1, 192.3, 188.1, 191.1, 194.1; H04N 5/44, 5/60, 5/445

(56) References Cited

U.S. PATENT DOCUMENTS

| | | | | |
|---|---|---|---|---|
| 3,676,781 A | | 7/1972 | Worcester | |
| 4,236,182 A | * | 11/1980 | Minoura et al. | 348/732 |
| 4,899,370 A | * | 2/1990 | Kameo et al. | 379/102.03 |
| 5,048,119 A | | 9/1991 | Wassink | |
| 5,933,192 A | * | 8/1999 | Crosby et al. | 375/240.25 |
| 6,188,448 B1 | * | 2/2001 | Pauley et al. | 348/731 |
| 6,198,513 B1 | * | 3/2001 | Cherrick | 348/731 |
| 6,212,680 B1 | * | 4/2001 | Tsinberg et al. | 725/39 |
| 6,249,322 B1 | * | 6/2001 | Sugihara | 348/634 |
| 6,405,372 B1 | * | 6/2002 | Kim et al. | 725/50 |
| 6,473,137 B1 | * | 10/2002 | Godwin et al. | 348/725 |
| 6,490,001 B1 | * | 12/2002 | Shintani et al. | 348/554 |

FOREIGN PATENT DOCUMENTS

| | | | |
|---|---|---|---|
| DE | 2933205 | | 10/1981 |
| DE | 3032701 | | 1/1984 |
| DE | GDR 244 249 | A1 | 12/1985 |
| DE | 69230683 | | 3/1993 |
| DE | 4318867 | | 12/1993 |
| EP | 0 689 308 | A1 | 12/1995 |
| EP | 0 531 918 | | 2/2000 |
| JP | 56-68025 | | 6/1981 |
| JP | 57-201317 | | 12/1982 |
| JP | 58-19022 | | 2/1983 |
| JP | 1-198103 | | 8/1989 |
| JP | 7-115641 | | 5/1995 |
| JP | 9-247646 | | 9/1997 |
| JP | 9-307826 | | 11/1997 |
| JP | 10-262230 | | 9/1998 |
| JP | 10-336606 | | 12/1998 |
| JP | 11-98425 | | 4/1999 |
| JP | 11-122548 | | 4/1999 |
| JP | 11-163814 | | 6/1999 |
| JP | 11-164224 | | 6/1999 |
| JP | 2002366507 | * | 12/2003 |

* cited by examiner

*Primary Examiner*—Sherrie Hsia
(74) *Attorney, Agent, or Firm*—Finnegan, Henderson, Farabow, Garrett & Dunner, L.L.P.

(57) ABSTRACT

A digital broadcast is received by a receiving unit 5, and is output from a speaker 9. During a waiting time for changing-over of channels, or the like, a control unit 11 causes a holding sound generating unit 15 generate a holding sound as a waiting signal. The holding sound is an intermittent synthetic sound, whose pitch is shortened according to the remainder of the waiting time. In another embodiment, the channel selected by a user is received and output with one receiving unit, and at the same time, the channels other than the selected channel are received and stored with another receiving unit. During the waiting time due to the changing-over of channels, received signals of the selected channel are read out and output. A user can be informed of the content of a broadcast during the waiting time.

7 Claims, 6 Drawing Sheets

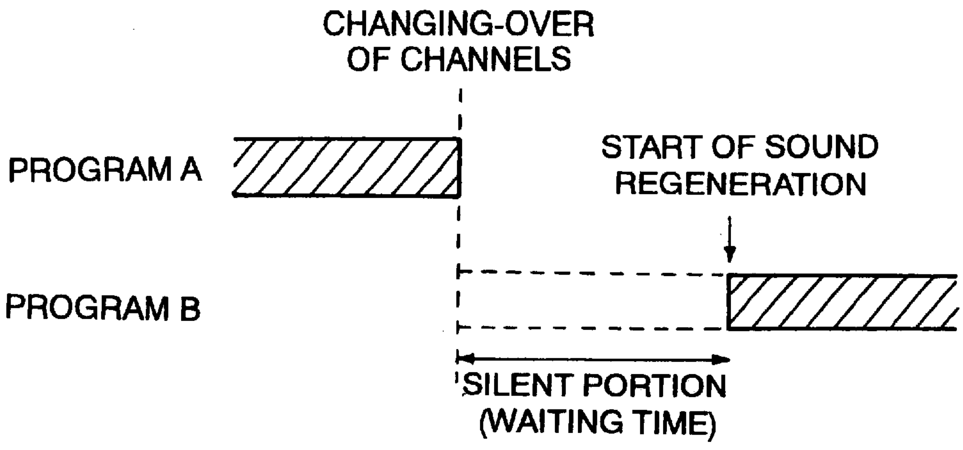
Fig. 3a PRIOR ART
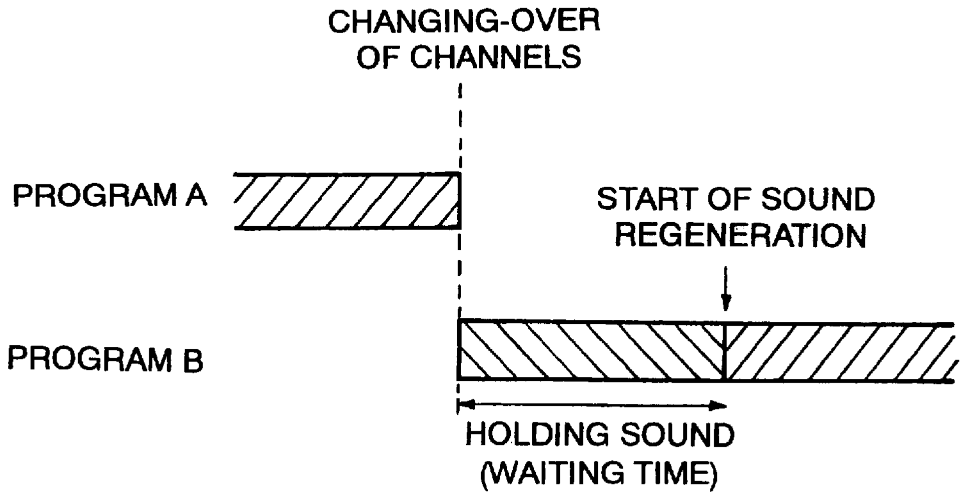
Fig. 3b PRESENT INVENTION

DIGITAL BROADCAST RECEIVER AND METHOD FOR RECEIVING AND OUTPUTTING DIGITAL BROADCASTS

BACKGROUND OF THE INVENTION

1. Field of the Invention

The present invention relates to a digital broadcast receiver and a method for receiving and outputting digital broadcasts, and more particularly, relates to a receiver and a method for outputting appropriate signals (sound, image) during a waiting time in changing of channels, or the like.

2. Description of the Related Art

Digital broadcasting is expected to provide various advantages such as higher signal quality and more channels compared with conventional analog broadcasts. In the present specification, digital broadcasting for mobile stations will be described. However, the present invention is not limited to the broadcast for mobile stations.

In a digital broadcast, processes such as error correction and data decoding are performed on received signals, and then the received signals are output to users. Accordingly, the received signals cannot be output immediately after a receiver is turned on. In addition, the received signals cannot be output immediately after changing-over of receiving channels. As used in the present specification, the period from the switching-on of a power source or the changing of channels until outputting received signals is called a "waiting time."

As described above, a conventional receiver cannot output the receiving signal until the waiting time has elapsed. Accordingly, for example, for digital radio, resulting in a period of silence. Therefore, there is such a possibility that a user is anxious whether or not operation of apparatuses are normal, or whether or not reception of signals is normal. In addition, there is a possibility that a user may mistakenly assume that there is no programming on the present channel. Even when there is no such misunderstanding, this waiting time may cause discomfort or annoyance to users.

Further, this waiting time is wasted time for users and could be compounded if, for example, the broadcast content finally output after the lapse of the waiting time is not interesting to the user. In such a case, the user must change over the channels again, and must spend the waiting time again. Sometimes, a scanning operation for searching a required channel is manually or automatically carried out by successively changing channels. In such an operation, a waiting time is generated whenever a channel is changed. Therefore, annoyance to the user is intensified.

The waiting time described above is longer in a digital broadcast for mobile stations than that in a digital broadcast for stationary receiving stations, as will be described later. In a digital broadcast, an interleave is generally adopted to cope with burst error generation. In the interleave, a data array is appropriately rearranged in a transmitter side, and is returned to the original array in a receiver side. Thus, errors in the data can be dispersed, and concentrated error generation in the data can be prevented.

When the interleave is adopted, a receiver side cannot output the received signal until the data necessary for returning the data array are collected. In a digital broadcast for mobile stations, rearranging of the data in a wide range is carried out taking into consideration multipass fading and signal interruption due to large obstructions. Therefore, it takes a relatively long time to collect the data necessary for rearranging the data array. As a result, the waiting time becomes longer, and amounts to, for example, several seconds. Because the waiting time is longer in a broadcast for mobile stations, problems due to the waiting time described above are even more pronounced in a broadcast received by a moving body.

SUMMARY OF THE INVENTION

The present invention addresses the problems described above, and its object is to provide a digital broadcast receiver and a method for receiving a digital broadcast and outputting the content of the broadcast without problems, such as user discomfort caused by the waiting time until a start of output of the received signal, described above.

A digital broadcast receiver according to the present invention is characterized in that the receiver comprises waiting time signal outputting means for outputting a predetermined signal during a waiting time from the selection of a receiving channel until the output of the received signal on the selected receiving channel.

This digital broadcast receiver of the present invention can allow the user to recognize that the receiver is normally working by outputting a predetermined signal during the waiting time, and that the selected channel is on the air, and the broadcast has not stopped. In addition, the first digital broadcast receiver can reduce user discomfort due to no output. Though digital broadcasts are applicable to a broadcast for sound or a broadcast for image and sound, the present invention is not limited to such broadcasts, and are applicable to any digital broadcast.

In this digital broadcast receiver according to the present invention, the selection of the receiving channel described above may be determined so as to be the selection by the switching-on of a power source. If such a method is adopted, the predetermined signal can be output during the waiting time caused by the switching-on of a power source. As a result, it is possible for a user to recognize that the receiver is normally working, when a power source switch is switched on.

In addition, in this digital broadcast receiver according to the present invention, the predetermined signal may be an intermittent sound signal in which the interval of the intermittence varies according to the elapse of time, or an intermittent signal in which the interval of the intermittence is shortened as the time elapses. With either of these methods, a user can recognize the elapse of time, and can also be reassured that the end of the waiting time is approaching.

A second aspect of the digital broadcast receiver according to the present invention is characterized in that this receiver comprises selecting means for selecting one of a plurality of channels, a first channel receiving unit for receiving the selected channel, signal outputting means for outputting the received signal on the received channel, second channel receiving means for receiving channels which include at least one of unselected channels other than the channels selected by said selecting means, signal storage means for storing the signal received by the second channel receiving means, and waiting time output control means for controlling the signal outputting means so that the received signal stored in said signal storage means is output from said signal outputting means until the preparation for outputting the received signal in the unselected channels from said signal outputting means has been completed, when said selecting means has selected other channels different from said selected channels.

In the digital broadcast receiver according to a second aspect of the present invention, the first channel receiving unit receives the channel selected by the selecting means from a plurality of channels, and the signal outputting means outputs the received signal on the received channel. The second channel receiving means receives channels which include at least one of unselected channels other than the channels selected by the selecting means, and the signal storage means stores the received signal of the channel received by the second channel receiving means. When other channel has been selected by the selecting means, the waiting time output control means controls the signal outputting means so that the received signal stored in the signal storage means is output from the signal outputting means until the preparation for outputting the received signal of this other channel from the signal outputting means has been completed. In other words, the received signal stored in the signal storage means is output during the waiting time produced after the selection of other channel. By this method, a user can recognize that the receiver is properly working. In addition, the user can recognize that the other channel selected is on the air, and the broadcast is not stopped. Furthermore, user discomfort or annoyance as a result of no output can be reduced. In addition, although digital broadcasts are applicable to a broadcast for sound or a broadcast for image and sound, the present invention is not limited to such broadcasts, but is applicable to any digital broadcasts of any content.

In such a digital broadcast receiver according to the present invention, it is possible to configure the receiver such that the second channel receiving means successively receives at least a channel other than the channels selected by the selecting means, and the waiting time output control means controls the signal outputting means so that the received signal corresponding to the channels other than the channels selected by the selecting means among the received signals stored in the signal storage means is output. In this manner, a received signal of a channel other than the selected channel can be output during the waiting time. The received signal output during the waiting time is an old signal before the changing-over of channels, but this old signal can sufficiently inform the user of a content of the selected channel. As a result, the user can recognize the content of the selected channel without wasting the waiting time and, further, can re-select other channels if the selected channel is not a desired channel.

In addition, in the digital broadcast receiver according to the present invention, it is possible to configure the receiver such that the second channel receiving means receives the channel of a predetermined genre from a plurality of the channels. In such an aspect of the present invention, it is possible to configure the receiver such that the predetermined genre is a genre related to the channel selected before the newly selected channel. It is possible to output the received signal of the channel of the genre related to the selected channel.

Furthermore, in the digital broadcast receiver according to the present invention, it is possible to configure the receiver such that the second channel receiving means successively receives a plurality of channels, and the signal storage means stores the received signals successively received by the second channel receiving means for each channel, wherein a predetermined manipulation time control means is provided for controlling the signal outputting means so that when the predetermined manipulation has been carried out, the received signals stored in the signal storage means for each channel are successively output from the signal outputting means. In this manner, it is possible to successively output the contents of the broadcast of a plurality of channels by carrying out a predetermined manipulation. Therefore, the user can judge which channel to select according to the successively broadcast output.

A third aspect of the digital broadcast receiver according to the present invention is characterized in that the receiver comprises channel selecting means for selecting one of a plurality of channels; a receiving unit for receiving the selected channel; signal outputting means for outputting a received signal of the received channel; information storage means for storing information about said plurality of the channels; and waiting time output control means for controlling the signal outputting means so that when said selecting means have selected another channel, the information about the other channel among the information stored in said information storage means is output from the signal outputting means during a period from the selection of the other channel until the completion of the preparation for outputting the received signals of the other channel from said signal outputting means.

In the digital broadcast receiver according to the present invention, the receiving unit may receive the channel selected with the channel selecting means out of a plurality of channels, and the signal outputting means may output the received signal of the received channel. When another channel is selected with the channel selecting means, the waiting time output control means control the signal outputting means so that the information about the other channel among the information about a plurality of the channels stored in the information storage means is output from the signal outputting means during a period from the selection of the other channel until the completion of the preparation for outputting the received signal of the other channel. In other words, during a waiting time produced immediately after the selection of the other channel, the information about the other channel selected is output. In this manner, a user can recognize that the receiver is properly working, and in addition, can obtain information about the other channel selected. Of course, the user can recognize also that the other channel selected is on the air, and the broadcast of this channel is not stopped. Furthermore, user discomfort when there is no output can be softened. In addition, though the digital broadcasts are applicable to a broadcast for sound or a broadcast for image and sound, the present invention is not limited to such broadcasts, but is applicable to any digital broadcasts. The information about channels includes names of broadcast stations, broadcast programs, genres of broadcast programs, or the like.

A method for receiving and outputting a digital broadcast according to another aspect of the present invention is characterized in that, when a receiving channel has been selected, a predetermined signal is output during a waiting time from the selection of the receiving channel until the output of the receiving signal of the selected receiving channel.

With this method for receiving and outputting a digital broadcast according to the present invention, it is possible for a user to recognize that the receiver is properly working through the predetermined signal output during the waiting time. In addition, it is possible for the user to recognize that the selected channel is on the air, and the broadcast of this channel has not stopped. Further, user discomfort stemming from no output can be softened.

A method for receiving and outputting a digital broadcast according to another aspect of the present invention is characterized in that (a) received signals of a plurality of channels are successively received and stored for each channel, and (b) when a receiving channel has been selected, the received signal of the channel corresponding to the selected receiving channel is output out of said stored receiving signals during a period from the selection of the receiving channel until the completion of the preparation for outputting the received signal of the selected receiving channel.

With this method for receiving and outputting a digital broadcast according to the present invention, it is possible for a user to recognize that the receiver is properly working by outputting the stored received signal during the waiting time. In addition, it is possible to inform the user of the contents of the broadcast of the selected channel at the time just before the selection. It is possible for the user to recognize that the other channel selected is on the air, and the broadcast is not stopped. Furthermore,user discomfort stemming from no output can be reduced.

A method for receiving and outputting a digital broadcast according to still another aspect of the present invention is characterized in that (a) information about a plurality of channels is stored for each channel, and (b) when a receiving channel has been selected, information about the channel corresponding to the selected receiving channel is output out of the stored information during a period from the selection of the selected receiving channel until the completion of the preparation for outputting the received signal on the selected receiving channel.

According to this method for receiving and outputting a digital broadcast according to the present invention, it is possible for a user to recognize that the receiver is properly working by outputting information about the other channel selected during the waiting time generated immediately after selecting another channel. In addition, it is possible to inform the user of information about the other channel selected. Of course, it is possible to make the user recognize that the other channel selected is on the air, and the broadcast is not stopped. Furthermore, user discomfort or annoyance due to a lack of output can be softened.

BRIEF DESCRIPTION OF THE DRAWINGS

FIG. 3 is a time chart showing the operation of a receiver shown in FIG. 1 at the channel changing-over.

DESCRIPTION OF THE PREFERRED EMBODIMENTS

Next, preferred embodiments of the present invention will be described with reference to the attached drawings. In these embodiments, the present invention is applied to a digital radio broadcast receiver for mobile stations.

Embodiment 1

Figure 1:
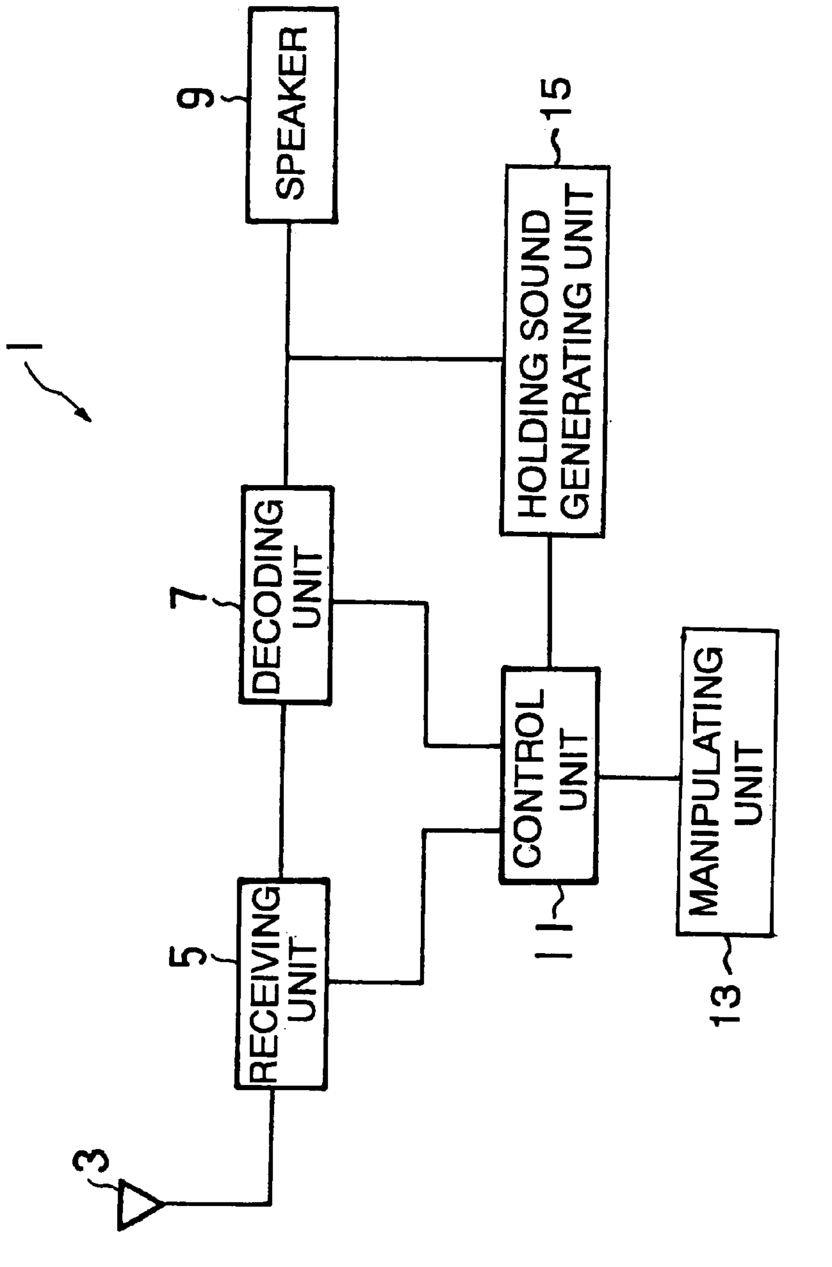
FIG. 1 is a block diagram showing the overall configuration of Example 1 of the present invention.

FIG. 1 is a block diagram showing the overall configuration of an Embodiment 1 of the present invention. A digital broadcast receiver 1 comprises a receiving unit 5 for receiving a digital broadcast signal using an antenna 3, a decoding unit 7 for carrying out a decoding process for received signals, and a speaker 9 for outputting analog signals generated by the decoding unit 7. The entire apparatus, including the receiving unit 5 and the decoding unit 7, is controlled by a control unit 11. In addition, a manipulating unit 13 for outputting various directions by user's manipulation is connected to the control unit 11. Further, a holding sound generating unit 15 generates a holding sound and sends it to the speaker 9 during the waiting time according to the direction of the control unit 11.

Next, operation of the apparatus shown in FIG. 1 will be described. When a user switches on a power source by manipulating the manipulating unit 13, the control unit 11 controls the receiving unit 5 so as to start reception. At the beginning of the reception, for example, the broadcast of the receiving channel at the preceding switching-off time is received. The receiving unit 5 includes a tuner for tuning to the receiving channel. Further, in the receiving unit 5, the necessary digital signal processing, such as the interleave processing, the error correction, and the like, is carried out. In the interleave processing, the data are rearranged to the original proper arrangement.

The received signal is sent from the receiving unit 5 to the decoding unit 7 to carry out the decoding processing of the digital signal. An analog signal is generated from the decoded data, and sent to the speaker 9, where it is output from the speaker 9 for a user.

It should be noted that certain amount of time is required after the power source has been switched on before sound can be output from the speaker 9. Such a period of time, as described previously, is referred to as the "waiting time" in the present specification. One factor contributing to the waiting time is the interleave processing. In the interleave processing, the data are properly rearranged at a transmitting side, and the data arrangement is returned to the original order at a receiving side. Consequently, the receiving side cannot output the broadcast until a quantity of data sufficient for returning the data arrangement is collected. In the digital broadcast for mobile stations, the range of the rearrangement for the interleave is set to be especially wide, and a longer period of time is necessary for collecting the necessary quantity of the data necessary for outputting the broadcast. Consequently, the waiting time becomes longer.

During the waiting time as described above, the control unit 11 directs the holding sound generating unit 15 to generate a holding sound. The holding sound signal (a waiting signal in the present invention) is sent to the speaker 9, and is output to the user from the speaker 9. In Embodiment 1, a simple intermittent synthetic sound, such as "beep, beep, beep - - - ", is used as the holding sound. Generation and outputting of such a synthetic sound are continued until the waiting time ends.

In addition, in Embodiment 1, the control unit 11 detects the length of the remainder of the waiting time, and shortens the pitch of the intermittent synthetic sound as the remainder of the waiting time becomes shorter and shorter.

Figure 2:
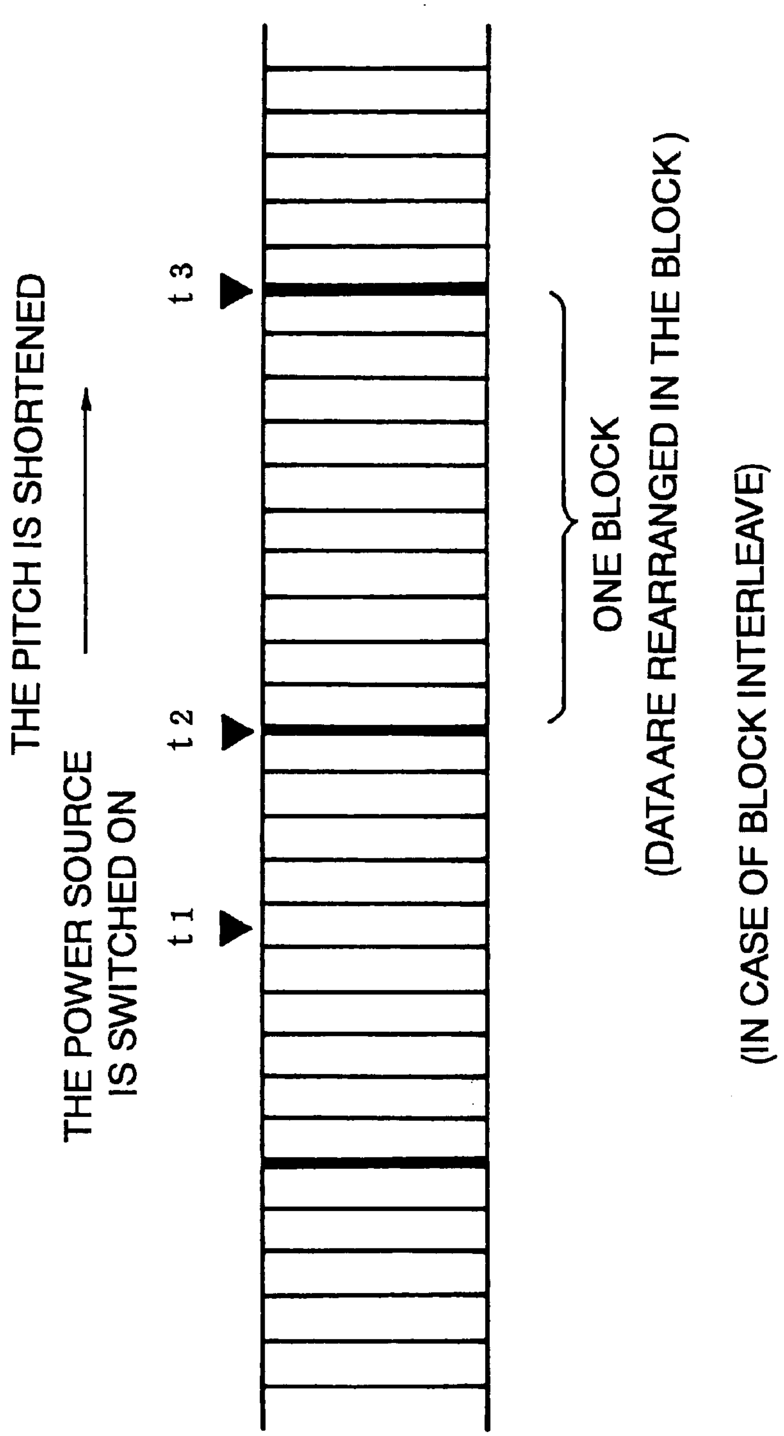
FIG. 2 is a figure showing the waiting time at the channel changing-over time when the block interleave is adopted.

Referring next to FIG. 2 showing a block interleave, rearrangement of the data within each block is carried out. In FIG. 2, time t1 represents the start of reception. Time t2 represents the start of reception of a certain block. All the data of the block are received at time t3. After t3, the rearrangement and decoding of the data are quickly carried out. Accordingly, the control unit 11 can approximate the remainder of the waiting time at time t2. During a period between t2 and t3, the pitch of the intermittent synthetic sound is shortened with the reduction of the remainder of the waiting time. Even when a convolution interleave is adopted, the control unit 11 approximates the remainder of the waiting time by an appropriate method, and changes the pitch of the holding sound according to the remainder of the waiting time.

Next, operation of the digital broadcast receiver 1 during changing-over of receiving channels will be described. When a user has selected another channel by manipulating the manipulating unit 13, the receiving unit 5 receives the signal of the newly selected channel and sends it to the decoding unit 7 according to the direction from the control unit 11. Then, the received signal of the newly selected channel is sent from the receiving unit 5 to the decoding unit 7, decoded at the decoding unit 7, and then output from the speaker 9 for the user.

In case of this changing-over of channels, a waiting time is generated in a similar manner as the case of the switching-on of a power source. Accordingly, the control unit 11 directs the holding sound generating unit 15 to generate the holding sound until the waiting time is over. Therefore, the holding sound is output from the speaker 9 to the user. Also in such a case, the pitch of the holding sound is changed according to the length of the remainder of the waiting time.

Referring now to FIGS. 3(*a*) and FIG. 3(*b*), where FIG. 3(*a*) shows related art, when the channel is changed over from a program A to a program B, a silent period (waiting time) is generated during the changing-over operation of the channels until the start of sound reproduction of program B. On the other hand, FIG. 3(*b*) shows the operation of the receiver according to the present invention. Because a holding sound is output during a period from the changing-over of channels until the start of sound reproduction, no silent period is generated.

As described above, according to Embodiment 1, a holding sound is output to a user during a waiting time which is caused by switching-on of a power source and changing-over of channels. The holding sound is one form of the waiting signals according to the present invention. In other words, the holding sound is a signal related to the waiting time until the start of the output of the receiving signal. By outputting this holding sound, a user can recognize that the receiver is properly working. In addition, the user can recognize that the present channel is on the air, and that the broadcast is not stopped. Further, the user does not feel a strange feeling due to no output.

In addition, according to the present invention, the holding sound indicates the length of the remainder of the waiting time until the start of the output with the interval of the pitch of the holding sound. This is convenient for a user, because the user can easily recognize the end of the waiting time.

In Embodiment 1, the control unit 11 estimates the waiting time as described above. However, it is not always necessary that the control unit 11 estimate the waiting time. In other words, it may be satisfactory that the control unit 11 gradually reduces the pitch of the holding sound from the start of the waiting time (changing-over of channels). Further, it may also be satisfactory that the holding sound generating unit 15 automatically shortens the pitch of the holding sound without receiving the direction from the control unit 11. In this process, a final pitch of the holding sound varies depending on the actual length of the waiting time. Even in such a case, a user can recognize the change of the remainder of the waiting time. Therefore, it is possible to attain the above advantages of the present invention.

Further, music may be used as a modification of the holding sound in Embodiment 1. The waiting time can be approximated based on the proceeding of the music. Further, the information indicating the waiting time may be represented using a display instead of the holding sound.

Embodiment 2

An Embodiment 2 of the present invention will next be described.

Figure 4:
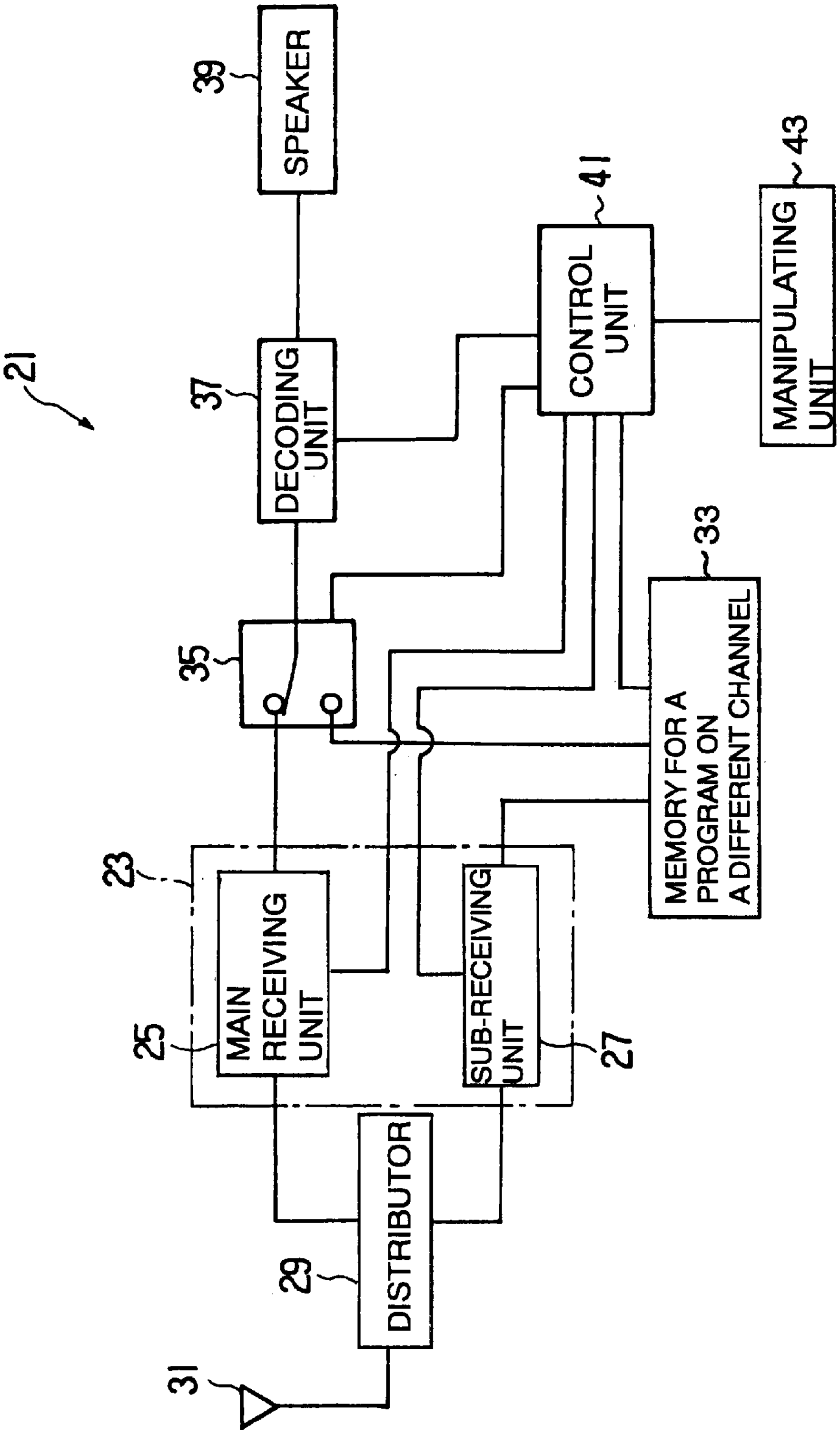
FIG. 4 is a block diagram showing the overall configuration of Example 2 of the present invention.

FIG. 4 is a block diagram showing the overall configuration of Embodiment 2. In a digital radio broadcast receiver 21 of Embodiment 2, a receiving unit 23 comprises a main receiving unit 25 and a sub-receiving unit 27. Both receiving units 25 and 27 are connected to an antenna 31 via a distributor 29.

The respective receiving units 25 and 27 each comprise a tuner, and independently carry out digital processing, such as interleave and error correction. The main receiving unit 25 receives the program of the channel selected by a user (selected channel). On the other hand, the sub-receiving unit 27 receives the channels other than the channel selected by a user (unselected channel), that is, a program on a different channel. The received signal of the program on the different channel received by the sub-receiving unit 27 is stored in a memory 33 for a program on a different channel.

The main receiving unit 25 and the memory 33 for a program on a different channel are connected to a decoding unit 37 via a changing switch 35. Therefore, a received signal is supplied to the decoding unit 37 from either the main receiving unit 25 or the memory 33 for a program on a different channel. Decoding processing of the digital signal is carried out at the decoding unit 37. An analog signal is generated from the decoded data. The analog signal is sent to a speaker 39, and is output to a user from the speaker 39.

A control unit 41 controls the entire apparatus, including the main receiving unit 25, the sub-receiving unit 27, the memory for a program on a different channel 33, the changing switch 35, and the decoding unit 37. In addition, a manipulating unit 43 for inputting various directions from a user is connected to the control unit 41.

Next, operation of the apparatus shown in FIG. 4 will be described. When a certain channel is selected through, for example, user manipulation of the manipulating unit 43, the control unit 41 directs the main receiving unit 25 to receive the broadcast signal of the selected channel. In addition, the control unit 41 fixes the changing switch 35 to the main receiving unit 25 side. Accordingly, the received signal of the selected channel is sent to the decoding unit 37, decoded at the decoding unit 37, and then output from the speaker 39.

At the same time that the broadcast of the selected channel is received and output using the main receiving unit 25 in this manner, the sub-receiving unit 27 operates under the control of the control unit 41 as follows. The sub-receiving unit 27 receives the broadcast signals of the programs on different channels other than the selected channel (unselected channel). The received signals are output to and stored in the memory 33 for a program on a different channel.

The sub-receiving unit 27 successively receives the broadcast signals of a plurality of channels other than the selected channel by carrying out time-division scanning. Consequently, the memory 33 for a program on a different channel successively stores the broadcast signals of a plurality of unselected channels. The length of reception of the respective channels are set so as to be nearly equal to the waiting time caused by the changing-over of channels. This is done to secure an amount of data sufficient for outputting the data during the following waiting time. It is preferable to set the reception period to be slightly longer than the waiting time.

Further, the sub-receiving unit 27 may successively receive the signals of all the unselected channels. However, because the number of digital broadcast channels is generally very large, it is satisfactory that the sub-receiving unit 27 receives the signals of only a part of the channels other than the selected channel. For example, it is satisfactory that only the channels of, for example, specific genre are received. It is preferable to receive only the channel of the same genre as that of the channel presently selected. For example, when the channel selected at present broadcasts music, the other music channels are received.

Next, operation of the apparatus at the changing-over of channels will be described. If a channel (newly selected channel) different from the channel selected at present has been newly selected, then the main receiving unit 25 receives the signal of the newly selected channel based on the direction of the control unit 41. However, as described above, a certain amount of time after the start of receiving the newly selected channel is required before the received signal can be output because it is necessary to wait for sufficient data for rearranging the interleave to be collected. This time necessary for other data processing is a part of the waiting time.

During this waiting time, the control unit 41 changes over the changing switch 35 to the side of the memory 33 for a program on a different channel. Then, the received signal of the newly selected channel is output to the memory 33 for a program on a different channel. The received signal is input to the decoding unit 37 via the changing switch 35, and after decoding the receiving signal is then fed to the speaker 39 as an analog signal from where it is output to a user.

In this case, the signal output from the speaker 39 is not a real time receiving signal, but a somewhat delayed received signal which has been stored in the memory 33 for a program on a different channel. However, a user can satisfactorily recognize the contents of the channel after changing-over of channels, on the basis of even such a signal.

When the waiting time has elapsed, the control unit 41 changes over the changing switch 35 again to the main receiving unit 25. Consequently, the received signal of the newly selected channel is output to a user in real time.

Figure 5:
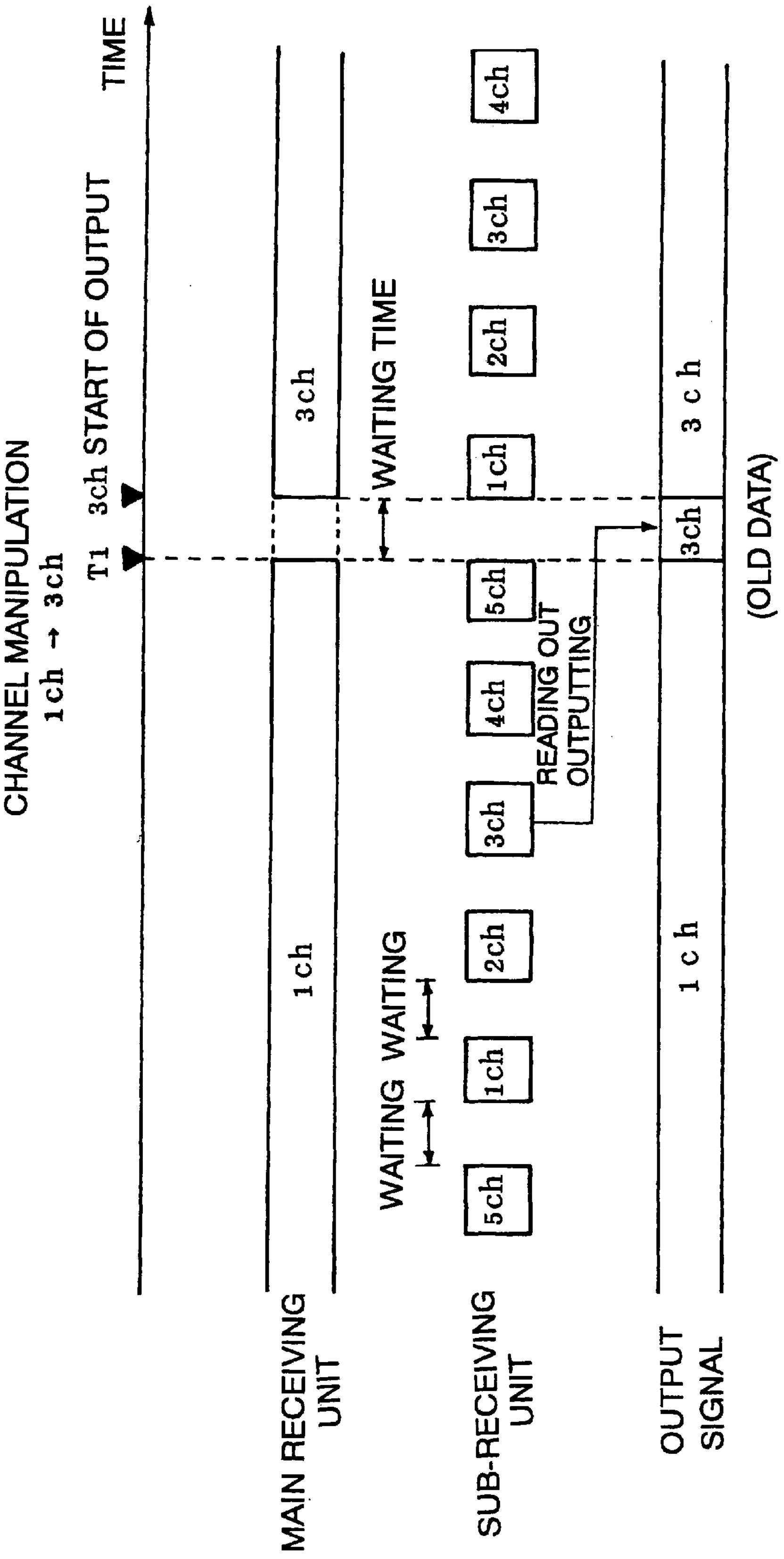
FIG. 5 is a time chart showing the operation of a receiver shown in FIG. 4 at the channel changing-over.

Next, the above operation will be described in further detail with reference to FIG. 5. In FIG. 5, in order to simplify the explanation, the number of channels are set to be five. However, generally more than five channels will be involved in actual digital broadcasting.

The selected channel before changing-over of channels is channel 1. The broadcast signal of channel 1 is received using the main receiving 25, and is output from the speaker 39. On the other hand, the broadcast signals of the 2nd, 3rd, 4th, and 5th channels (unselected channel) are successively and repeatedly received by the sub-receiving unit 27. The sub-receiving unit 27 receives the signal of the selected first channel.

For each channel, the signals are received for a period corresponding to the waiting time. These received receiving signals are stored in the memory 33 for a program on a different channel. When a new signal is received for the same channel, the stored signal is abandoned (FIFO processing is carried out for every channel). A waiting time is generated also by changing-over of channels in the sub-receiving unit 27.

Next, changing-over operation from channel 1 to channel 3 is carried out at time T1 shown in FIG. 5. This operation is carried out by, for example, a user selecting a s "channel 3" button on the manipulating unit 43. In this case, a certain amount of time is required for changing-over of receiving channels in the main receiving unit 25. During the waiting time, the received signal of the channel 3 is read out from the memory 33 for a program on a different channel, decoded, and output. When the waiting time is over, reception and output of channel 3 is carried out using the main receiving unit 25.

As described above, according to Embodiment 2, the signals on the unselected channels are received and stored, while the signal on the channel selected by a user is being received and output. During the waiting time generated by changing-over of channels, the received signal of the newly selected channel is read out and presented to the user.

Therefore, according to Embodiment 2, it is also possible to make a user recognize that the receiver is properly working during the waiting time, similarly to Embodiment 1 described above. In addition, the user can recognize that the present channel is on the air, and that the broadcast is not stopped. Further, the user need not feel discomfort stemming from no output.

In the case of Embodiment 2, the content to be output during the waiting time is the content of the old broadcast received a short while ago as shown in FIG. 5. However, the content of the older broadcast can satisfactorily inform the user beforehand of the content of the program after the changing-over of channels. In other words, although there is a slight time difference between the content output during the waiting time and the contents of the actual broadcast in real time, there is a high correlation between the two. Therefore, the user can judge whether or not he is interested in the content of the next channel during the waiting time, that is, without waiting the completion of the changing-over of channels. This lessens a user's feeling that the waiting time is wasted uselessly.

A user can also use the receiver according to Embodiment 2 in the following manner. When the user wishes to search for a desirable channel by manually scanning a succession of channels, the received signals of the respective channels are read out from the memory 33 for a program on a different channel, and are output. When the user finds a desired channel, the user halts the operation for changing over channels. Then, after the waiting time has elapsed, reception and outputting of the finally selected channel begin in real time.

In a conventional apparatus, when the a continuous changing-over operation for searching the desired channel is carried out, similar to the operation described above, a waiting time is generated whenever the changing-over operation is carried out. If the waiting time is, for example, several seconds, then the total of the waiting time after changing over channels 10 times amounts to several tens of seconds. Further, the periods for outputting the respective channels are generally short compared with the length of the waiting time, because the user changes over channels immediately after he finds content in which he has an interest. Therefore, when such operation is carried out in a conventional apparatus, channel searching requires a very long time, and further is inconvenient for the user. Accordingly, such searching of channels can frustrate a user. On the contrary, with the present invention, because the waiting time can be remarkably shortened, the search of channels can be quickly carried out in a short period in continuous channel changeovers. Accordingly, a significant advantage can be obtained in reduction of user frustration.

In addition, in Embodiment 2, it is preferable that the following automatic scanning be executed, when a predetermined manipulation is carried out on the manipulating unit 43. The predetermined manipulation may includes, for example, selecting a scanning button.(not shown) or the like provided on the manipulating unit 43.

In FIG. 4, when the predetermined manipulation is carried out, the control unit 41 changes over the changing switch 35 to the memory 33 for a program on a different channel. The received signals from each channel are output in a predetermined order to the decoding unit 37 from the memory 33 for a program on a different channel. Accordingly, signals from each channel are successively output from the speaker 39. Thus, according to Embodiment 2, it is possible to execute automatic scanning operation in a digital receiver, similar to that of a conventional analog receiver. Moreover, no waiting time is necessary in changing-over of channels in the scanning operation. Therefore, the time necessary for scanning can be shortened, and such an automatic scanning is very convenient for a user.

Embodiment 3

Next, an Embodiment 3 of the present invention will be described.

Figure 6:
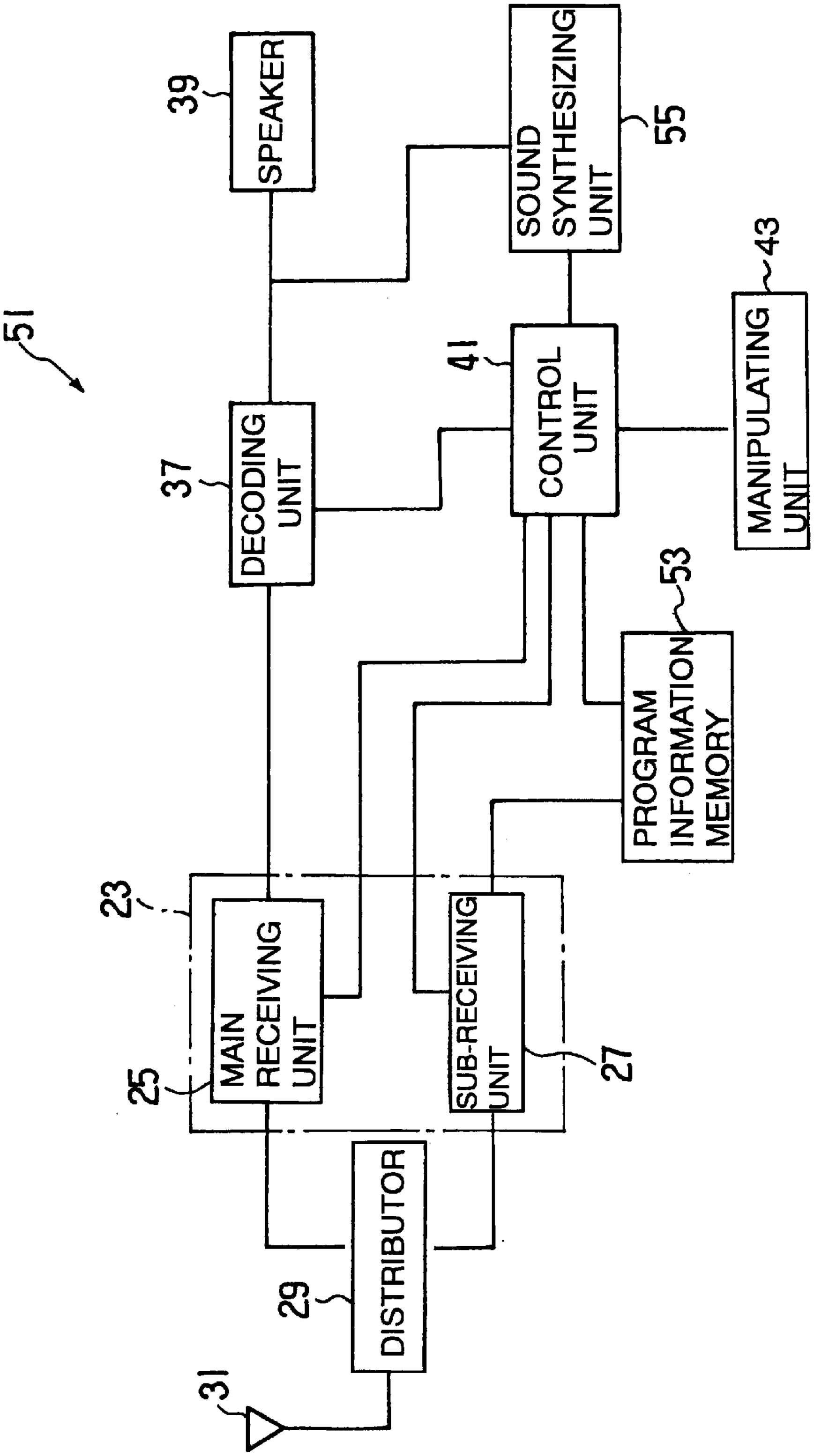
FIG. 6 is a block diagram showing the overall configuration of Example 3 of the present invention.

FIG. 6 is a block diagram showing the overall configuration of a digital radio broadcast receiver 51 in Embodiment 3. Similar components to those of the receiver shown in FIG. 4 are represented by the same reference numerals, and will not be described here.

Unlike the apparatus shown in FIG. 4, in the apparatus shown in FIG. 6, a changing switch is not provided. In addition, a program information memory 53 is provided in place of the memory for a program on a different channel. Further, a synthetic sound generating unit 55 is provided for generating synthetic sound according to direction from the control unit.

In Embodiment 3, the sub-receiving unit 27 need not receive a program on a different channel. Instead, the sub-receiving unit 27 receives the broadcast of a program information channel under the control of the control unit 41. In a digital broadcast, it is preferable that one or a plurality of channels among a large number of channels be allotted to the program information. In the program information channels, instead of ordinary broadcasts, information about the contents of the respective broadcasts of a large number of channels of digital broadcasts are transmitted. The program information corresponds to the television and radio sections commonly found in an ordinary newspaper or to, for example, an EPG (Electronic Program Guide). The program information is received by the sub-receiving unit 27, and then is stored in the program information memory 53.

Next, operation of the apparatus when channels are changed by a user will be described. Awaiting time is generated as a period from the changing-over of channels until the start of the output of the next channel. During such a waiting time, the control unit 41 operates as follows. The control unit 41 reads out the program information from the program information memory 53 about the newly selected channel after changing over channels. Based on the read-out information, the control unit 41 generates the information for introducing the newly selected channel, and sends this introducing information to a synthetic sound generating unit 55. The synthetic sound generating unit 55 generates synthetic sounds for announcing the introducing information under the direction of the control unit 41. The synthetic sound is output from the speaker 39. After outputting the introducing information, the waiting time elapses and the output of the received signal of the main receiving unit 25 begins.

The introducing information may be, for example, a name of the broadcast station of the newly selected channel, or, for example, a name of the program on the air, or, for example, a genre of the program. A name of the music in a music broadcast on the air is one of the preferable introducing information.

As described above, according to Embodiment 3, the introducing information of the newly selected channel after changing-over channels is presented to a user during the waiting time. Therefore, the user can recognize the contents of the selected channel without waiting the changing-over of channels to complete, and can save time.

In addition, according to Embodiment 3, it is possible to enable a user to recognize that the receiver is properly working, even in the waiting time, like Embodiment 1 described above. In addition, the user can recognize that the present channel is on the air, and that the broadcast is not stopped. Further, the user does not feel strange feeling due to no output.

Although preferred Embodiments of the present invention have been described using specific terminology, the present invention is not limited to the examples described in the above Embodiments 1 to 3. The above Embodiments can, of course, be modified within the scope of the present invention. For example, the receiver according to the present invention may be configured with a software receiver. For example, a tuner and a speaker are connected to the software receiver.

Further, the present invention may be applied to a digital TV broadcast. In this case, the output during the waiting time may be any of the broadcast composed of sound only, character or image only, or both of character or image and sound.

Further, although the present invention may preferably be applied to a digital broadcast for mobile stations, it can also be applied to a digital broadcast for a stationary receiving station and other general digital broadcasts. In addition, the digital broadcasts may be either a terrestrial broadcast or a satellite broadcast.

Embodiments of the present invention have been described with reference to Embodiments. However, the present invention is not limited to these Embodiments. As a matter of course, the present invention may be applied in various changes and modifications without departing from the spirit and scope of the present invention.

What is claimed is:

1. A digital broadcast receiver for receiving and outputting a digital broadcast, comprising:

selecting means for selecting one channel from a plurality of channels;

a first channel receiving unit for receiving said selected channel;

signal outputting means for outputting a received signal of the received channel;

second channel receiving means for receiving channels which include unselected channels other than the channel selected by said selecting means;

signal storage means for storing the received signals of the channels received by said second channel receiving means; and waiting time output control means for controlling said signal outputting means so that, when said selecting means have selected another channel different from said selected channel, the received signals stored in said signal storage means are output from said signal outputting means during a period until the completion of the preparation for outputting the received signals of the other channel form said signal outputting means, wherein said second channel receiving means successively receives the signals of said unselected channels in a time-division manner, said signal storage means stores the received signals successively received by said second channel receiving means for each channel; and said waiting time output control means controls said signal outputting means so that the received signal corresponding to the other channel selected by said selecting means among the received signals stored in said signal storage means is output from said signal outputting means.

2. The digital broadcast receiver according to claim 1, wherein said second channel receiving means receive channels of prescribed genres among a plurality of the channels.

3. The digital broadcast receiver according to claim 2, wherein said predetermined genres are genres related to the channel selected before said other channel.

4. The digital broadcast receiver according to claim 1, wherein said digital broadcast is a sound broadcast.

5. The digital broadcast receiver according to claim 1, wherein said digital broadcast is a broadcast containing images and sound.

6. A method for receiving and outputting a digital broadcast, comprising the steps of:

successively receiving signals from a plurality of channels and storing the received signals for each channel;

outputting the received signals of the channel corresponding to the selected receiving channel among said stored receiving signals, when a receiving channel has been selected, during a period until the completion of the preparation for outputting the received signal of the selected receiving channel;

successively receiving signals of unselected channels in a time-division manner;

storing the received signals successively received for each channel; and controlling signal output so that the received signal corresponding to another channel selected among the stored received signals is output.

7. A method for receiving and outputting a digital broadcast, comprising the steps of:

storing information about a plurality of channels;

outputting the information about a receiving channel corresponding to the selected receiving channel among said stored information, when a receiving channel has been selected, during a period until the completion of the preparation for outputting the received signal of the selected receiving channel;

successively receiving signals of unselected channels in a time-division manner;

storing the received signals successively received for each channel; and controlling signal output so that the received signal corresponding to another channel selected among the stored received signals is output.

* * * * *